(12) United States Patent
Allison (10) Patent No.: US 7,146,601 B2
(45) Date of Patent: Dec. 5, 2006

(54) METHOD AND APPARATUS FOR DERIVING FUNCTIONS FROM OTHER FUNCTIONS IN A PROGRAMMING LANGUAGE

(75) Inventor: David S. Allison, San Ramon, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 762 days.

(21) Appl. No.: 09/977,717

(22) Filed: Oct. 12, 2001

(65) Prior Publication Data

US 2003/0088850 A1 May 8, 2003

(51) Int. Cl.
*G06F 9/44* (2006.01)

(52) U.S. Cl. .................. 717/114; 717/116; 717/106

(58) Field of Classification Search ............ 717/108, 717/114, 116, 122, 152; 719/315
See application file for complete search history.

(56) References Cited

U.S. PATENT DOCUMENTS

| | | | | |
|---|---|---|---|---|
| 5,493,682 | A | * | 2/1996 | Tyra et al. .................. 717/122 |
| 5,515,536 | A | * | 5/1996 | Corbett et al. .............. 719/315 |
| 5,696,974 | A | * | 12/1997 | Agrawal et al. ............. 717/152 |
| 6,182,282 | B1 | * | 1/2001 | Stoodley et al. ............ 717/116 |
| 6,185,728 | B1 | * | 2/2001 | Hejlsberg ................... 717/109 |
| 6,857,118 | B1 | * | 2/2005 | Karr et al. .................. 717/114 |

OTHER PUBLICATIONS

Michail et al.; "Accessing Software Libraries by Browsing Similiar Classes, Functions, and Relationships"; ACM, 1999; pp. 463-472.*
Castagna et al.; "A Calculus for Overloaded Functions with Subtyping"; ACM 1992; pp. 182-192.*
Taivalsaari, Antero; "On the Notion of Inheritance"; ACM Computing Surveys, vol. 28, No. 3, Sep. 1996; pp. 438-479.*
Henry Lieberman, "*Using Prototypical Objects to Implement Shared Behavior in Object Oriented Systems;*" Sep. 1986, pp. 214-223, Proceedings of First ACM Conference on Object-Oriented Programming Systems, Languages and Applications, Portland, OR.

* cited by examiner

*Primary Examiner*—Kakali Chaki
*Assistant Examiner*—William H. Wood
(74) *Attorney, Agent, or Firm*—Osha Liang LLP (57) ABSTRACT

The present invention provides a method and apparatus by which functions may be derived from other functions in a programming language. A function is essentially processed as a class, except that the object is automatically destructed after the final line of code is executed. In one or more embodiments of the present invention, a function has the ability to inherit from a superfunction. Inheritance in this context means that all functions in the hierarchy execute in order from the lowest level superfunction to the derived function invoked by the calling statement. Further, the derived function has access to all nonprivate methods and variables defined in the superfunctions. All functions in the hierarchy remain instantiated until the derived function has executed. At this point, the functions are destructed in reverse hierarchical order. If a function in the hierarchy enters an error condition, the execution process is halted.

10 Claims, 7 Drawing Sheets

METHOD AND APPARATUS FOR DERIVING FUNCTIONS FROM OTHER FUNCTIONS IN A PROGRAMMING LANGUAGE

BACKGROUND OF THE INVENTION

1. Field of the Invention

This invention relates to the field of object-oriented programming. More specifically, the present invention relates to the derivation of a function from another function in a programming language.

Sun, Sun Microsystems, the Sun logo, Solaris and all Java-based trademarks and logos are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

2. Background Art

In a traditional programming language, such as Java, C++, or Delphi, the concepts of "functions" and a "classes" are distinct. A function computes some value based on its set of input arguments. A class is used to define a type for use by the program. The distinction between classes and functions causes problems. With respect to functions, they cannot take advantage of class-based options such as inheritance. Furthermore, a funtion cannot be defined from within a function.

Before discussing this problem, it is instructive to summarize the differences between functions and classes in the context of object-oriented programming.

Object Oriented Programming

Object-oriented programming is a method of creating computer programs by combining certain fundamental building blocks, and creating relationships among and between the building blocks. The building blocks object-oriented programming systems are called "objects." An object is a programming unit that groups together a data structure (instance variables) and the operations (methods) that can use or affect that data. Thus, an object consists of data and one or more operations or procedures that can be performed on that data. The joining of data and operations into a unitary building block is "encapsulation." In object-oriented programming, operations that can be performed on the data are referred to as "methods." An object can be instructed to perform one of its methods when it receives a "message." A message is a command or instruction to the object to execute a certain method. It consists of a method selection (name) and arguments that are sent to an object. A message tells the receiving object what to do.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are generally based on one of two schemes for representing general concepts and sharing knowledge. One scheme is known as the "class" scheme. The other scheme is known as the "prototype" scheme. Both the set-based ("class" scheme) and prototype-based object-oriented programming schemes are generally described in Lieberman, "Using Prototypical Objects to Implement Shared Behavior in Object-Oriented Systems," OOPSLA 86 Proceedings, September 1986, pp. 214–223.

In accordance with the embodiments of the present invention, the class-based object-oriented scheme will be described.

Class Scheme

An object that describes behavior is called a "class." Objects that acquire a behavior and that have states are called "instances." Thus, in the Java language, a class is a particular type of object. In Java, any object that is not a class object is said to be an instance of its class. An example of a class definition in Java is as follows:

```
class X {
    X (int arg);           // constructor
    // class members
}
```

This structure defines the class to be an encapsulation of a set of members.

Some of the class members are defined as being "special" because they have the same name as the class itself. These members are known as a constructor. A class member can be either a data member, or a variable, or a function, also known as a method.

Two or more classes form a "hierarchy." Each subclass in the hierarchy may add to or modify the behavior of the object in question and may also add additional states. Inheritance is a fundamental property of the class scheme and allows objects to acquire behavior from other objects.

The inheritance hierarchy is the hierarchy of classes defined by the arrangement of superclasses and subclasses. Except for the root classes, every class has a superclass, and any class may have an unlimited number of subclasses. Each class inherits from those classes above it in the hierarchy. Thus, a superclass has the ability to pass its characteristics (methods and instance variables) onto its subclasses.

```
An example of a superclass in Java is:
    class X {
    public:
        int x;
        // other members of X
    };
Then a class derived from the superclass, X, is defined as:
    class Y : public X {
    public:
        // other members of Y
    };
```

Y inherits the accessible members of X. In this example, the class Y has a member 'int x' inherited from class X.

Figure 1:
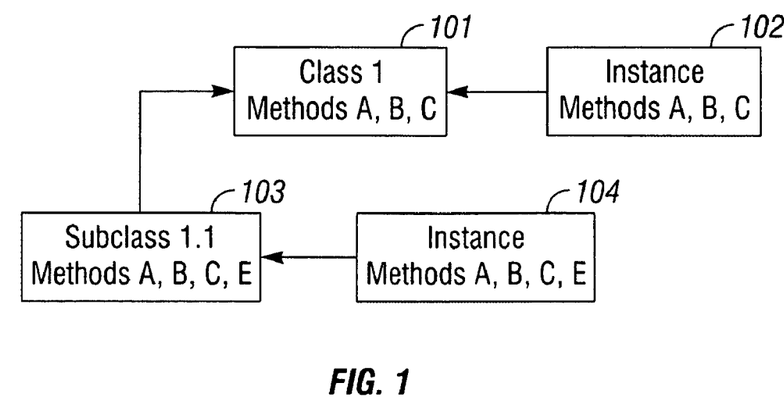
FIG. 1 is a diagram illustrating the concept of class inheritance.

FIG. 1 is a block diagram that illustrates inheritance. Class 1 (generally indicated by block 101) defines a class of objects that have three methods in common, namely, A, B and C. An object belonging to a class is referred to as an "instance" of that class. An example of an instance of class 1 is block 102. An instance such as instance 102 contains all the methods of its parent class. Block 102 contains methods A, B and C.

As discussed, each class may also have subclasses, which also share all the methods of the class. Subclass 1.1 (indicated by block 103) inherits methods A, B and C and defines an additional method, E. Each subclass can have its own instances, such as, for example, instance 104. Each instance of a subclass includes all the methods of the subclass. For example, instance 104 includes methods A, B, C and E of subclass 1.1.

Object-oriented programming languages that utilize the class/instance/inheritance structure described above implement a set-theoretic approach to sharing knowledge. This approach is used in object-oriented programming languages, such as C++, SmallTalk, Delphi and Java.

Functions

A function is a named section of a program that performs a specific task. Some programming languages, such as Java, Delphi and C++, distinguish between a function, which returns a value, and a procedure, which performs some operation but does not return a value. Most programming languages come with a prewritten set of functions that are kept in a library.

A function contains a sequence of instructions and associated variables for performing a particular task. Most languages allow arguments to be passed to the function. Function code is executed from multiple places within software, even from within the function itself. In this case, the function is a recursive function. In Java, a function is defined as follows:

```
int Z(int arg1, int arg2)      {
    // statement
}
```

This code block defines a function called "Z" that returns an integer and takes two integer parameters.

Unlike a class, a function body can contain only variable declarations and statements. No other functions can be defined inside the body. Also, a function cannot inherit from another function or class. These differences make the use of functions less than optimal. In particular, functions are one of the building blocks of an object-oriented scheme. Since they are limited, in that they cannot inherit or be defined inside another, it causes programmers to use functions less frequently. This results in more ad-hoc solutions to problems and goes against the principles of object oriented programming.

SUMMARY OF THE INVENTION

The present invention provides a method and apparatus by which functions may be derived from other functions in a programming language. In one embodiment, functions and classes are semantically similar and follow the pattern of: keyword name(parameters), where keyword is either class or function. Both function and class declarations contain statements that are executed after the structure is instantiated. In either construct, these statements comprise constructor code. A function optionally returns a value.

In one embodiment, software is written in an interpreted programming language implementing the present invention. A function is essentially processed as a class, except that the object is automatically destroyed after the final line of constructor code is executed.

In one or more embodiments of the present invention, a function has the ability to inherit from a superfunction. Inheritance in this context means that all functions in the hierarchy execute in order from the lowest level superfunction to the derived function invoked by the calling statement. Further, the derived function has access to all nonprivate methods and variables defined in the superfunctions. All functions in the hierarchy remain instantiated until the derived function has executed. At this point, the functions are destroyed in reverse hierarchical order. If a function in the hierarchy enters an error condition, the execution process is halted.

DETAILED DESCRIPTION OF THE INVENTION

The present invention is directed to the derivation of a function from another function in a programming language. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Unified Semantics

In accordance with one or more embodiments of the present invention, the semantic rules of both classes and functions follow the pattern of: keyword name(parameters), where keyword is either class or function, name is the name of the construct and parameters is an optional list of one or more parameters. The unification of function and class semantics is also described in copending application entitled, "Method and Apparatus for Unifying the Semantics of Functions and Classes in a Programming Language", assigned to the same assignee as the current application, filed on Oct. 12, 2001, Ser. No. 09/977,516 and incorporated herein by reference. Both the function and class bodies contain statements that are executed after the structure is instantiated. In either construct, these statements comprise constructor code. A function also optionally returns a value.

In accordance with one embodiment of the present invention, a function is an object that is automatically destroyed after it optionally returns a value to its calling statement. In one embodiment, software is written in an interpreted programming language implementing the present invention. The interpreter instantiates a function on a memory stack. An example of a function definition in accordance with one or more embodiments of the present invention is as follows:

```
function X (arg1, arg2) {
    // function members
}
```

In one or more embodiments of the present invention, a function definition contains the same members that a class body may contain, including public and private variables and function.

Object Instantiation

Figure 2A:
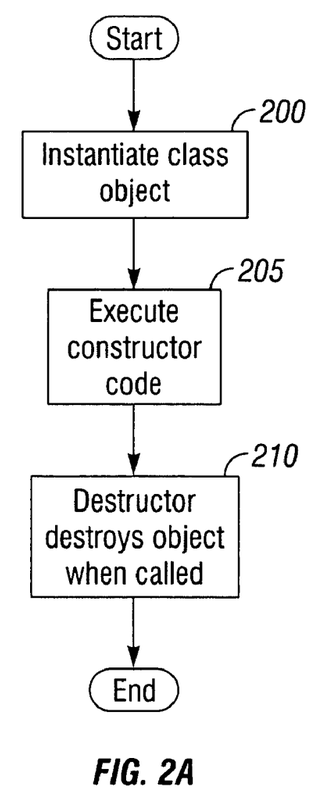
FIG. 2A is a diagram illustrating the instantiation process of a class-type object.

FIG. 2A illustrates the use of a class in accordance with an embodiment of the present invention. In block 200, a class-type object is instantiated. In block 205, any constructor code in the body of the class is executed. As is well known to those of skill in the art, a constructor may contain no user-defined code. In this case, the algorithm simply instantiates the object in block 200 and continues. A class-type object remains instantiated until it is destroyed by a destructor or similar function which may act to remove the function from the system. Thus, in block 210 the object is destroyed when a destructor is called.

Figure 2B:
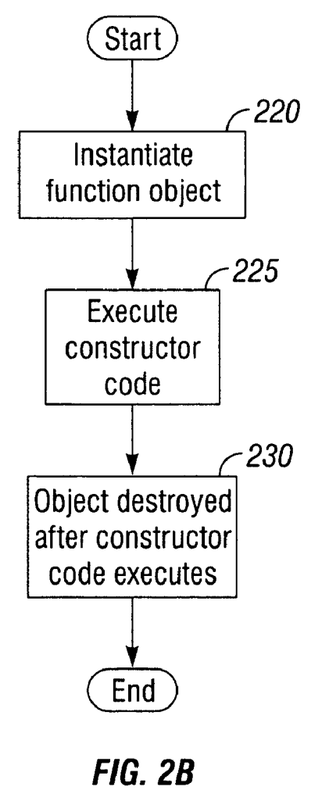
FIG. 2B is a diagram illustrating the instantiation process of a function-type object.

FIG. 2B illustrates the use of a function-type object in accordance with an embodiment of the present invention. In block 220, a function-type object is instantiated. In block 225, any constructor code in the body of the class is executed. Function constructor code comprises the code block within the body of the function. In one embodiment of the present invention, the function returns a result. In another embodiment of the present invention, the function executes a block of code but does not return a result. In block 230, the function-type object is destroyed after the constructor code completes execution.

Figure 3:
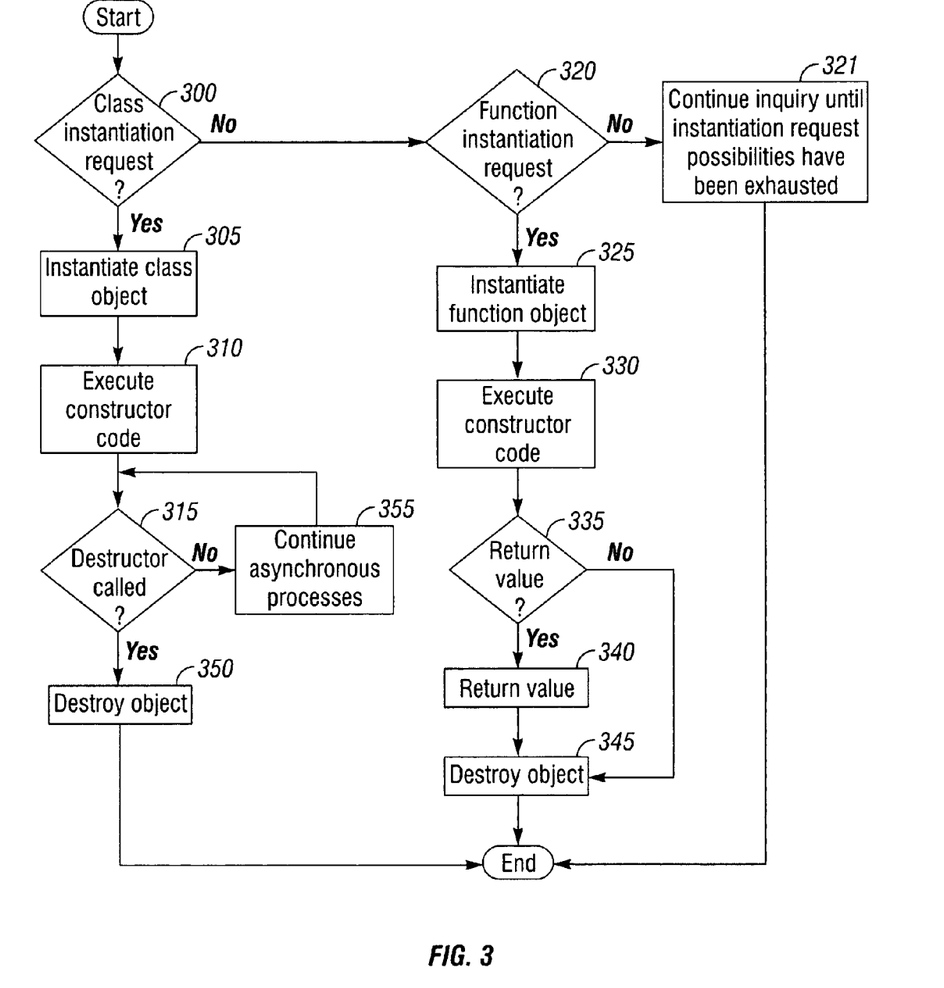
FIG. 3 is a flow diagram illustrating the instantiation process of an object in accordance with one or more embodiments of the present invention.

FIG. 3 illustrates an embodiment of the present invention. Decision blocks 300 and 320 determine the subject of an instantiation request. This request is any keyword whose effect is the instantiation of an object-type in the language. An example of an instantiation request in prior art languages is the new keyword in Java and C++. Thus, decision block 300 determines whether a class instantiation request has been made. If no, then decision block 320 determines whether a function instantiation request has been made. If no, then in decision block 321 a line of inquiry continues until the instantiation request possibilities have been exhausted.

If the result of decision block 300 is positive, then in block 305, the class-type object is instantiated. Instantiation block 305 comprises the reservation of a memory block on the operating system heap, as well as tasks inherent in the creation of objects and well known to those of skill in the art. In block 310, any constructor code in the object is executed.

In one embodiment, constructor code is a series of statements within the class body. Decision block 315 determines whether a destructor for the object has been called. Block 315 is asynchonous with respect to the other blocks in that the destructor of an object is called at any point in time after the object is instantiated. If the result of block 315 is negative, then in block 355 the program continues asynchronous processing. If the result of block 320 is positive, then in block 350 the object is destroyed. In one embodiment, destruction block 350 decrements an object counter each time the destructor is called until the counter reaches 0. At this point, the reserved memory is freed and the object is deleted. In another embodiment, the memory is immediately freed and the object deleted.

Returning to block 320, a function-type object is instantiated in block 325 as a result of a positive determination. Instantiation block 325 comprises the reservation of a memory block on the operating system stack, as well as tasks inherent in the creation of objects and well known to those of skill in the art. In block 330, the constructor code of the function-type object is executed. The constructor code is a series of statements within the body of the function.

Decision block 335 determines whether the function returns a value. If so, then in block 340, a value is returned to the function calling point. At this point the function-type object is automatically destroyed in block 345. Block 345 is also executed directly after block 335 if the determination of block 335 is negative. The destruction of the function-type object comprises the release of memory reserved for the object.

Function Inheritance

The present invention is most easily understood in relation to a class hierarchy. In the following example, Y.print inherits from X.print, where Y is a subclass of X:

```
// define a superclass X
class X( ) {
    public function print( ) {        // define print function
    }
}
// define a subclass Y (derived from x)
class Y( ) : public X( ) {
    public function print( ) : print( ) {   // define a print function that inherits from
                                            // the print function in X
    }
}
```

In this example, Y.print inherits from X.print. X.print will be executed before Y.print any time the function Y.print is invoked. This relationship is similar to the execution order of the constructors of the classes in a classic class hierarchy.

Figure 4A:
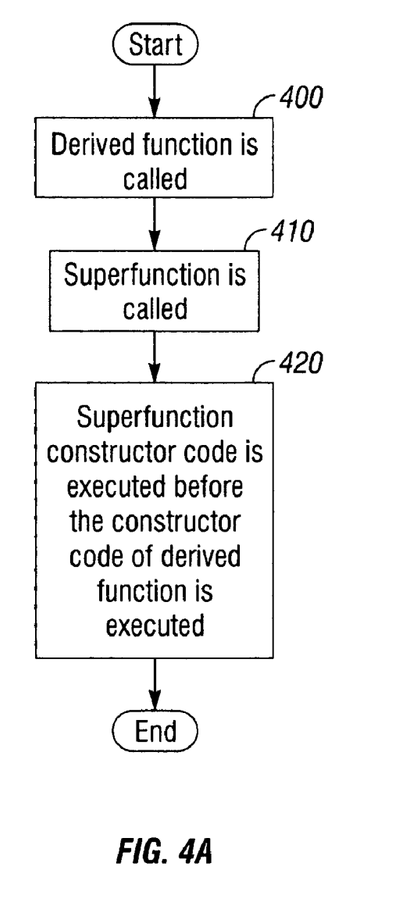
FIG. 4A is a diagram illustrating an embodiment of the present invention.

FIG. 4A is a diagram illustrating one embodiment of the present invention. In block 400, a derived function is invoked. A derived function, or subfunction, is a function-type object that inherits from another function-type object. In block 410, the function from which the derived function inherits, the superfunction, is called. In one or more embodiments of the present invention, a superfunction is itself a derived function. In the present embodiment, the superfunction is not derived from another function. The methodology of determining a superfunction in object oriented programming is well known to those of skill in the art. p In block 420, the superfunction code is executed. If the superfunction executes successfully, then the constructor code of the derived function is executed. A value otherwise returned by the superfunction is passed to the derived function.

Figure 4B:
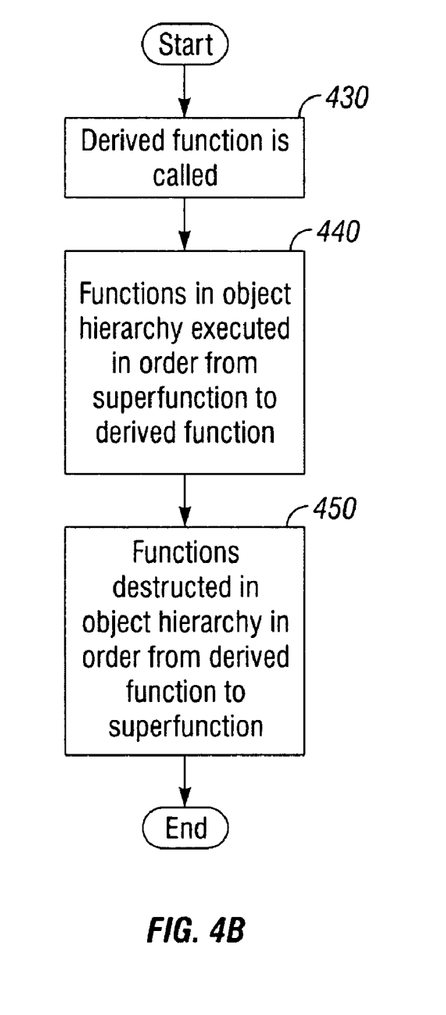
FIG. 4B is a diagram of the life cycle of an embodiment of the present invention.

FIG. 4B is a diagram illustrating the life cycle of a function-type object hierarchy. In block 430, a derived function is called. In block 440, functions in the hierarchy are executed in order from the lowest level superfunction to the derived function. In block 450, the function-type objects are destructed in hierarchical order from the derived function to the lowest level superfunction.

In one or more embodiments of the present invention, function inheritance is not limited to methods encapsulated within a class. Just as a class in the prior art has the capability of inheriting from any other class, a function has the ability to inherit from any function. For example:

```
function checkArgs (arg) {
    // check the arg
}
function func1 (arg) : checkArgs (arg) {
    // arg is guaranteed to be correct
}
function func2 (arg) : checkArgs (arg) {
    // arg is guaranteed to be correct
}
```

In this example, an argument checking function, checkArgs, is defined. Two functions requiring an initial argument check (func1 and func2) are derived from checkArgs. In this context, checkArgs is a superfunction to func1 and func2.

Inheritance Table

Figure 8:
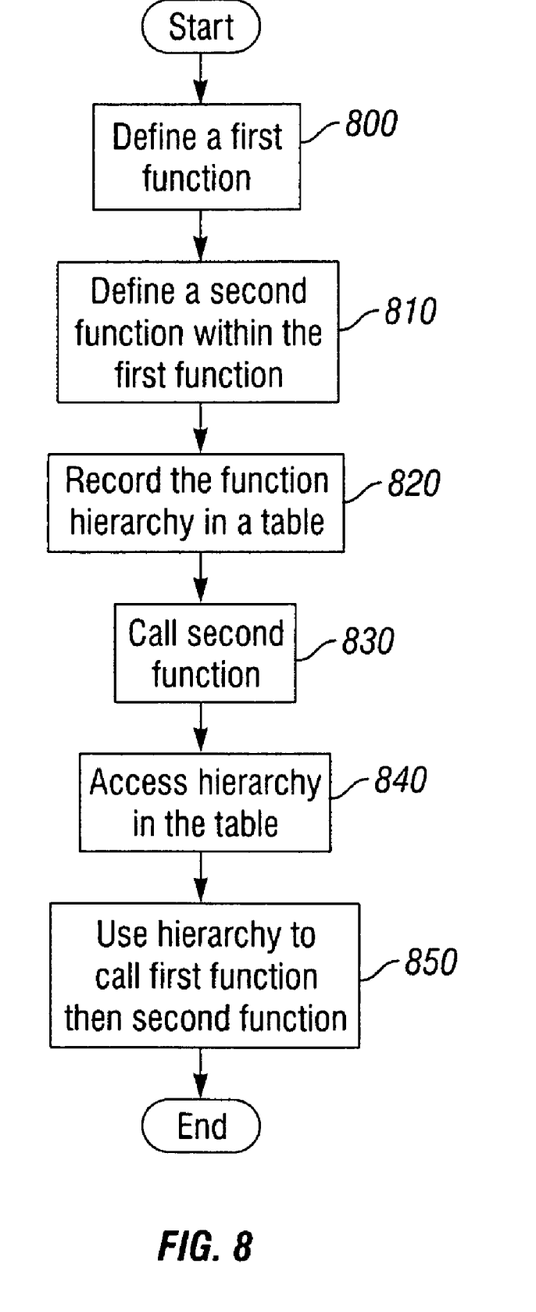
FIG. 8 is a flowchart illustrating another embodiment of the present invention.

In one embodiment, the inheritance between functions is recorded in a table. The table may be in random access memory (RAM), on a disk drive or other non-volatile storage medium, or elsewhere. This embodiment is illustrated in FIG. 8.

In block 800, a first function is defined. The first function is a superfunction to a second function, defined in block 810. In block 820, the inheritance hierarchy is recorded in a table. In block 830, the second function is called. In block 840, the hierarchical relationship as between the first and second functions is determined from the table. In block 850, the first function is called before the second function is executed.

Figure 5:
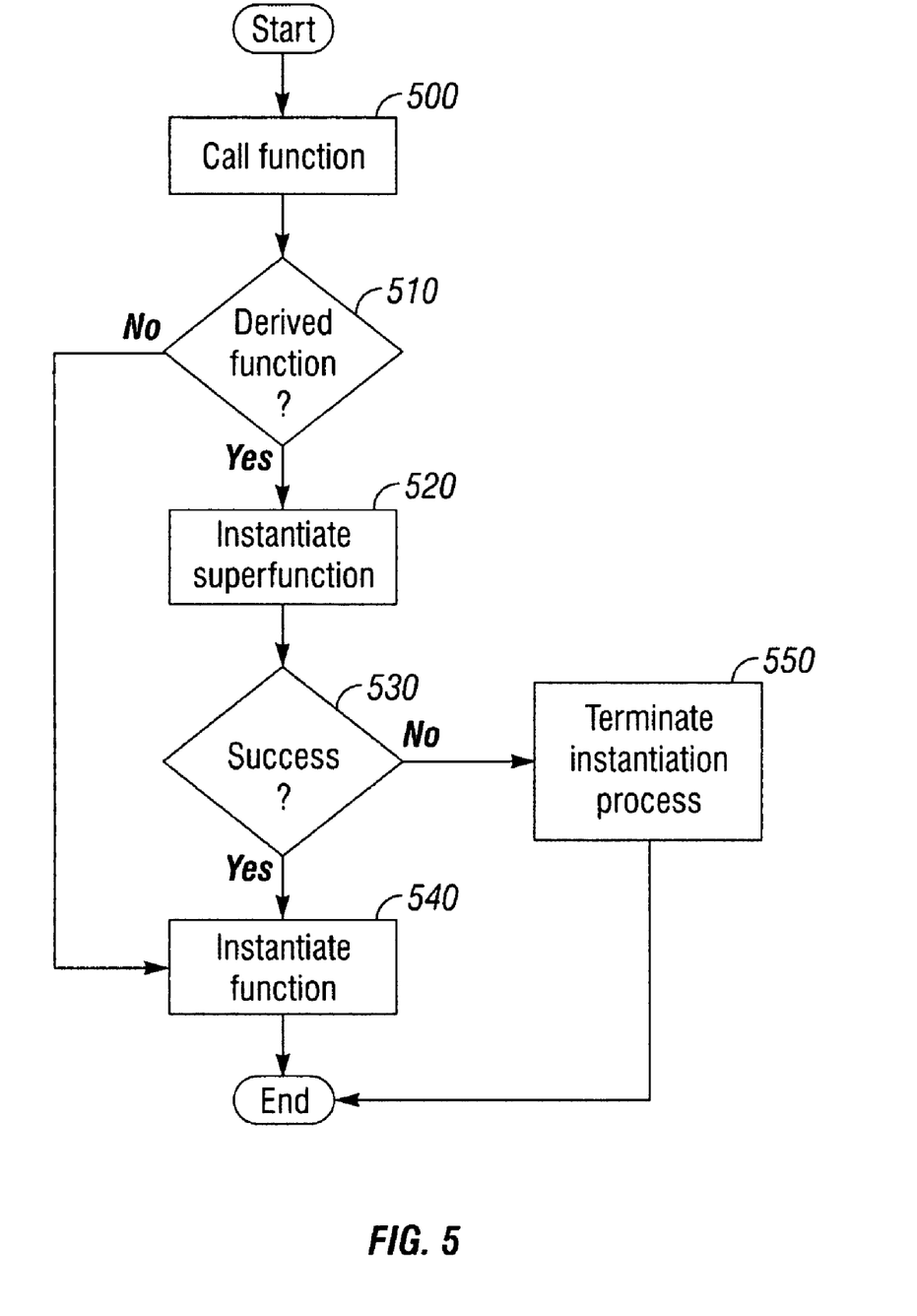
FIG. 5 is a flow chart illustrating an embodiment of the present invention.

FIG. 5 illustrates another embodiment of the present invention. For exemplary purposes, the instantiation process of a two-level function-type object hierarchy is illustrated. In block 500, a function is invoked. A determination is made in decision block 510 as to whether the function is a derived function. If no, then the function is instantiated as a function-type object in block 540. If yes, then in block 520, the superfunction is invoked and a function-type object representing the superfunction is instantiated.

A determination is made in decision block 530 as to whether the execution of the function was successful. If no, then in block 550, the function instantiation process is terminated. In one embodiment, the derived function returns to the point in the program at which it was invoked without executing its constructor code. If the result of block 530 is yes, then in block 540, the derived function is instantiated and the constructor code is executed.

Figure 6:
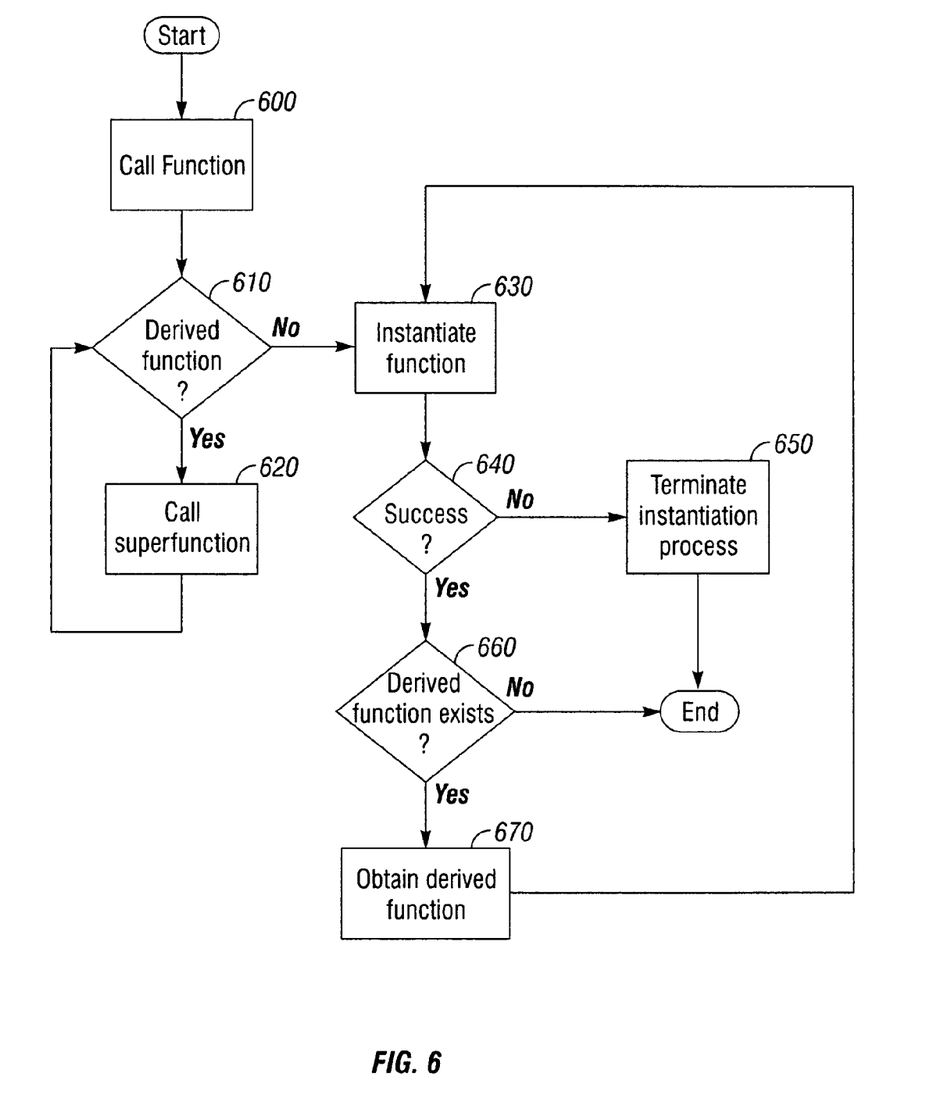
FIG. 6 is a flowchart illustrating another embodiment of the present invention.

FIG. 6 illustrates an embodiment of the present invention in which a multilevel function-type object hierarchy is instantiated. In block 600, a function is called. A determination is made in decision block 610 as to whether the function is a derived function. If yes, then in block 620 the superfunction is recursively called and the algorithm returns to block 610. If no, then the current function is the lowest level superfunction. In block 630, the superfunction is instantiated. The instantiation process includes the execution of the constructor code in the function body.

A determination is made in block 640 as to whether the function successfully executes. A successful execution is one in which no error conditions exist when the function completes. If the result of block 640 is no, then the instantiation process is terminated in block 650. If the result of block 640 is yes, then in block 660 the algorithm continues recursive processing of the hierarchy at block 630. Essentially in block 660 a determination is made as to whether the recently instantiated object is a superfunction for a derived function. If yes, then the derived function is obtained in block 670 and instantiated in block 630. If no, then the entire hierarchy has been executed and the algorithm terminates.

Embodiment of Computer Execution Environment (Hardware)

Figure 7:
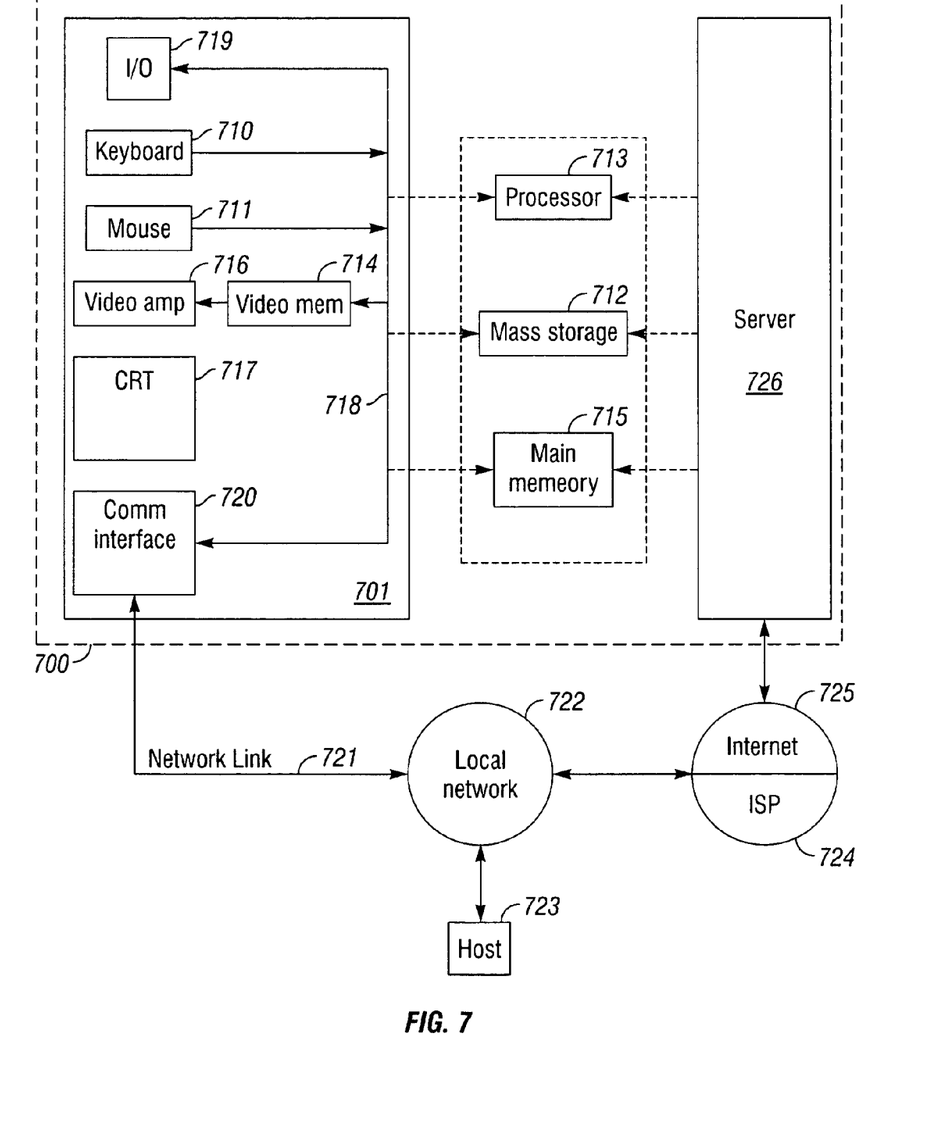
FIG. 7 is a diagram of a general purpose computer.

An embodiment of the invention can be implemented as computer software in the form of computer readable program code executed in a general purpose computing environment such as environment 700 illustrated in FIG. 7, or in the form of bytecode class files executable within a Java™ run time environment running in such an environment, or in the form of bytecodes running on a processor (or devices enabled to process bytecodes) existing in a distributed environment (e.g., one or more processors on a network). A keyboard 710 and mouse 711 are coupled to a system bus 718. The keyboard and mouse are for introducing user input to the computer system and communicating that user input to central processing unit (CPU) 713. Other suitable input devices may be used in addition to, or in place of, the mouse 711 and keyboard 710. I/O (input/output) unit 719 coupled to bi-directional system bus 718 represents such I/O elements as a printer, A/V (audio/video) I/O, etc.

Computer 701 may include a communication interface 720 coupled to bus 718. Communication interface 720 provides a two-way data communication coupling via a network link 721 to a local network 722. For example, if communication interface 720 is an integrated services digital network (ISDN) card or a modem, communication interface 720 provides a data communication connection to the corresponding type of telephone line, which comprises part of network link 721. If communication interface 720 is a local area network (LAN) card, communication interface 720 provides a data communication connection via network link 721 to a compatible LAN. Wireless links are also possible. In any such implementation, communication interface 720 sends and receives electrical, electromagnetic or optical signals which carry digital data streams representing various types of information.

Network link 721 typically provides data communication through one or more networks to other data devices. For example, network link 721 may provide a connection through local network 722 to local server computer 723 or to data equipment operated by ISP 724. ISP 724 in turn provides data communication services through the world wide packet data communication network now commonly referred to as the "Internet" 725. Local network 722 and Internet 725 both use electrical, electromagnetic or optical signals which carry digital data streams. The signals through the various networks and the signals on network link 721 and through communication interface 720, which carry the digital data to and from computer 700, are exemplary forms of carrier waves transporting the information.

Processor 713 may reside wholly on client computer 701 or wholly on server 726 or processor 713 may have its computational power distributed between computer 701 and server 726. Server 726 symbolically is represented in FIG. 7 as one unit, but server 726 can also be distributed between multiple "tiers". In one embodiment, server 726 comprises a middle and back tier where application logic executes in the middle tier and persistent data is obtained in the back tier. In the case where processor 713 resides wholly on server 726, the results of the computations performed by processor 713 are transmitted to computer 701 via Internet 725, Internet Service Provider (ISP) 724, local network 722 and communication interface 720. In this way, computer 701 is able to display the results of the computation to a user in the form of output.

Computer 701 includes a video memory 714, main memory 715 and mass storage 712, all coupled to bidirectional system bus 711 along with keyboard 710, mouse 711 and processor 713. As with processor 713, in various computing environments, main memory 715 and mass storage 712, can reside wholly on server 726 or computer 701, or they may be distributed between the two. Examples of systems where processor 713, main memory 715, and mass storage 712 are distributed between computer 701 and server 726 include the thin-client computing architecture developed by Sun Microsystems, Inc., the palm pilot computing device and other personal digital assistants, Internet ready cellular phones and other Internet computing devices, and in platform independent computing environments, such as those which utilize the Java technologies also developed by Sun Microsystems, Inc.

The mass storage 712 may include both fixed and removable media, such as magnetic, optical or magnetic optical storage systems or any other available mass storage technology. Bus 718 may contain, for example, thirty-two address lines for addressing video memory 714 or main memory 715. The system bus 718 also includes, for example, a 32-bit data bus for transferring data between and among the components, such as processor 713, main memory 715, video memory 714 and mass storage 712. Alternatively, multiplex data/address lines may be used instead of separate data and address lines.

In one embodiment of the invention, the processor 713 is a SPARC microprocessor from Sun Microsystems, Inc., a microprocessor manufactured by Motorola, such as the 680X0 processor, or a microprocessor manufactured by Intel, such as the 80X86 or Pentium processor. However, any other suitable microprocessor or microcomputer may be utilized. Main memory 715 is comprised of dynamic random access memory (DRAM). Video memory 714 is a dual-ported video random access memory. One port of the video memory 714 is coupled to video amplifier 716. The video amplifier 716 is used to drive the cathode ray tube (CRT) raster monitor 717. Video amplifier 716 is well known in the art and may be implemented by any suitable apparatus. This circuitry converts pixel data stored in video memory 714 to a raster signal suitable for use by monitor 717. Monitor 717 is a type of monitor suitable for displaying graphic images.

Computer 701 can send messages and receive data, including program code, through the network(s), network link 721, and communication interface 720. In the Internet example, remote server computer 726 might transmit a requested code for an application program through Internet 725, ISP 724, local network 722 and communication interface 720. The received code may be executed by processor 713 as it is received, and/or stored in mass storage 712, or other non-volatile storage for later execution. In this manner, computer 700 may obtain application code in the form of a carrier wave. Alternatively, remote server computer 726 may execute applications using processor 713, and utilize mass storage 712, and/or video memory 715. The results of the execution at server 726 are then transmitted through Internet 725, ISP 724, local network 722 and communication interface 720. In this example, computer 701 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Thus, a method and apparatus for the derivation of a function from another function in a programming language is described in conjunction with one or more specific embodiments. The invention is defined by the following claims and their full scope an equivalents.

I claim:

1. A method for executing multiple functions, comprising:
defining a superfunction;
defining a derived function,wherein said superfunction is explicitly specified and said derived function inherits from said superfunction;
calling said derived function, comprising transparently executing said superfunction and then executing said derived function after said superfunction has been executed,
wherein arguments of said superfunction and said derived function are the same.

2. The method of claim 1, further comprising:
destructing said derived function and then said superfunction.

3. The method of claim 2, further comprising:
halting the executing process when any function exits in an error condition.

4. The method of claim 1, further comprising:
accessing a table to determine if an inheritance relationship exists between said superfunction and said derived function.

5. The method of claim 4, wherein said table is stored in a random access memory.

6. A computer program product comprising:
a computer usable medium having computer readable program code embodied therein configured to execute multiple functions, said computer program product comprising:
computer readable code configured to cause a computer to define a superfunction;
computer readable code configured to cause a computer to define a derived function, wherein said superfunction is explicitly specified and said derived function inherits from said superfunction; and
computer readable code configured to cause a computer to call said derived function, comprising:
computer readable code configured to cause a computer to transparently execute said superfunction and then execute said derive function after said superfunction has been executed,
wherein arguments of said superfunction and said derived function are the same.

7. The computer program product of claim 6, further comprising:
   computer readable code configured to cause a computer to destruct said derived function and then said superfunction.
8. The computer program product of claim 7, further comprising:
   computer readable code configured to cause a computer to halt the executing process when any function exits in an error condition.

9. The computer program product of claim 6, further comprising:
   computer readable code configured to cause a computer to access a table to determine if an inheritance relationship exists between said superfunction and said derived function.
10. The method of claim 9, wherein said table is stored in a random access memory.

* * * * *